United States Patent
Lee

(10) Patent No.: US 10,046,795 B2
(45) Date of Patent: Aug. 14, 2018

(54) MOUNTING ASSEMBLY FOR VEHICLE

(71) Applicant: MANDO CORPORATION, Pyeongtaek-si, Gyeonggi-do (KR)

(72) Inventor: Gi Hyung Lee, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/422,412

(22) Filed: Feb. 1, 2017

(65) Prior Publication Data

US 2017/0225708 A1 Aug. 10, 2017

(30) Foreign Application Priority Data

Feb. 5, 2016 (KR) .................. 10-2016-0014765

(51) Int. Cl.
| | |
|---|---|
| *B62D 1/02* | (2006.01) |
| *B62D 7/22* | (2006.01) |
| *B62D 3/12* | (2006.01) |
| *B62D 27/02* | (2006.01) |
| *B62D 27/04* | (2006.01) |
| *B62D 27/06* | (2006.01) |

(52) U.S. Cl.
CPC .............. *B62D 7/226* (2013.01); *B62D 1/02* (2013.01); *B62D 3/12* (2013.01); *B60Y 2410/10* (2013.01); *B62D 27/023* (2013.01); *B62D 27/04* (2013.01); *B62D 27/065* (2013.01)

(58) Field of Classification Search
CPC . B62D 7/226; B62D 3/12; B62D 1/02; B62D 27/023; B62D 27/065; B62D 27/04; B62D 2410/10
See application file for complete search history.

(56) References Cited

U.S. PATENT DOCUMENTS

| | | | | |
|---|---|---|---|---|
| 5,388,884 A | * | 2/1995 | Keehner .............. | B60G 99/002 296/190.03 |
| 6,102,416 A | * | 8/2000 | Harkrader ............... | B62D 3/12 280/771 |
| 7,322,588 B2 | * | 1/2008 | Vandaele ................. | B62D 3/12 280/93.515 |
| 8,523,206 B2 | * | 9/2013 | Degenstein ............. | B62D 3/12 180/428 |
| 2005/0104314 A1 | * | 5/2005 | Maruyama ........... | F16F 1/3835 280/93.515 |
| 2005/0116434 A1 | * | 6/2005 | Kim ........................ | B62D 3/12 280/93.502 |
| 2016/0207569 A1 | * | 7/2016 | Iwamoto ................ | B62D 21/11 |
| 2016/0257335 A1 | * | 9/2016 | Dieudonne ............. | B62D 3/12 |

* cited by examiner

Primary Examiner — Drew J Brown
(74) Attorney, Agent, or Firm — Hauptman Ham, LLP

(57) ABSTRACT

The present invention relates to a mounting assembly for a vehicle for coupling, to a chassis, a housing in which a steering device is mounted, the mounting assembly including: a first bush that is configured to be coupled to a mounting hole that is formed in the housing, and is configured to have a coupling groove formed therein; a second bush that is configured to be provided between the housing and the chassis, and is configured to have a through hole formed to lead to the coupling groove; and a bolt that is configured to fix the housing to the chassis, wherein the second bush is inserted into the bottom of the first bush to then be coupled, and the bolt is engaged with the coupling groove by passing through an assembly hole that is formed in the chassis and by passing the through hole.

10 Claims, 8 Drawing Sheets

MOUNTING ASSEMBLY FOR VEHICLE

CROSS REFERENCE TO RELATED APPLICATION

This application claims priority from Korean Patent Application No. 10-2016-0014765, filed on Feb. 5, 2016, which is hereby incorporated by reference for all purposes as if fully set forth herein.

BACKGROUND OF THE INVENTION

1. Field of the Invention

The present invention relates to a mounting assembly for a vehicle, and more specifically, relates to a mounting assembly for a vehicle by which: a bolt can be easily engaged without interfering with a housing or peripheral parts because the bolt is engaged on the side of a chassis; an impact that is generated when engaging a bolt and a vibration that is generated by the internal parts that are provided inside the housing by adopting bushes and buffering members; and the deformation of the chassis can be prevented and the housing can be stably fixed to the chassis by supporting the housing and the chassis in the position therebetween.

2. Description of the Prior Art

In general, a steering system of the vehicle is configured to have: a steering wheel; a steering shaft that is provided under the same; and a housing that is coupled to the steering shaft to convert the power transmission direction while reducing the rotational force.

Meanwhile, the housing is formed to have a hollow in which a rack is installed, which extends long in the horizontal direction, and an opening is formed in the center of the same in the direction intersecting the rack into which a pinion is inserted.

FIG. 1 is an exploded perspective view showing a pinion housing that constitutes such a conventional housing. As shown in the drawing, the pinion housing 1 has openings at both ends and at the upper surface thereof to allow the pinion and the rack to be installed therein to intersect each other, and a mounting portion 2 protrudes from the outer surface of the central portion thereof at both sides to have a widely expanded shape.

Meanwhile, each mounting portion 2 has a mounting hole 3 that is formed in the vertical direction in each central portion thereof, and a bolt made of a metal is engaged with the mounting hole 3 while a mounting bush 4 is interposed therebetween such that the head of the bolt is positioned in the outside of the pinion housing 1 and the end thereof is engaged with a chassis in order to fix the pinion housing 1 to the chassis.

In addition, the mounting bush 4 is formed to have an approximately cylindrical shape to be inserted into the mounting hole 3, and is configured such that a pipe part 4b made of a metal and a rubber part 4a made of rubber are bonded on the inner/outer side thereof in order to prevent noise, vibration, and abrasion due to a direct and tight contact between the pinion housing 1 and the bolt made of a metal.

At this time, the pipe part 4b of the mounting bush 4 has a flange that is formed by bending the upper end thereof facing the head of the bolt that is inserted into the same outwards, and the rubber part 4a that is installed on the outer surface of the pipe part 4b is compressively inserted into the mounting hole 3 while both ends thereof are shaped into a flange.

In addition, the rubber part 4a has different thicknesses between the circumferential direction and the axial direction depending on a load transmitted thereto, and particularly, the rubber part 4a is configured to strongly resist the axial load of the rack that moves in the axial direction inside the housing including the pinion housing 1.

Thus, the mounting bush 4 is compressively installed in the mounting hole 3 after determining the installation position according to the thickness of the rubber part 4a, and a bolt is inserted into the pipe part 4b of the mounting bush 4 to then be fixed by rotating the head thereof such that the end of the bolt is engaged with the chassis.

However, in the vehicle mounting assembly, according to the prior art, since the bolt is engaged on the side of the housing, the housing or peripheral parts connected to the housing may obstruct the path for the engagement of the bolt when engaging the bolt. Thus, it is impossible to make an engagement of the bolt.

As a result, the housing cannot be mounted on the chassis, and it is difficult to secure a space because the installation space for the peripheral parts that are installed in the housing is limited.

Furthermore, an impact that is generated when engaging a bolt and a vibration that is generated by the housing may be transferred to the chassis through a direct contact in order to thereby cause the deformation of the chassis and in order to thereby fail to stably support the housing on the chassis, and the chassis may be damaged in severe cases.

SUMMARY OF THE INVENTION

The present invention has been made based on the above-described background, and the objective of the present invention is to provide a mounting assembly for a vehicle by which a bolt can be easily engaged without interfering with a housing or peripheral parts connected to the same because the bolt is engaged on the side of a chassis, and by which a space for installing the housing and the peripheral parts can be secured.

In addition, another objective of the present invention is to provide a mounting assembly for a vehicle that adopts bushes and buffering members in order to thereby: buffer an impact that is generated when engaging a bolt and a vibration that is generated by the housing; support the housing and the chassis while the bushes and the buffering members are interposed therebetween to then prevent the deformation of the chassis; and stably fix the housing to the chassis.

The objective of the present invention is not limited thereto, and other objectives that have not been mentioned may be understood by those skilled in the art from the description below.

The present invention may provide a mounting assembly for a vehicle for coupling a housing in which a steering device is mounted to a chassis, which may include: a first bush that is configured to be coupled to a mounting hole that is formed in the housing, and is configured to have a coupling groove formed therein; a second bush that is configured to be provided between the housing and the chassis, and is configured to have a through hole that is formed to lead to the coupling groove; and a bolt that is configured to fix the housing to the chassis, wherein the second bush is inserted into the bottom of the first bush to then be coupled, and the bolt is engaged with the coupling groove by passing through an assembly hole that is formed in the chassis and the through hole.

According to the present invention described above, a bolt can be easily engaged without interfering with a housing or peripheral parts connected to the same because the bolt is engaged on the side of a chassis, and a space for installing the housing and the peripheral parts can be secured.

In addition, since the bushes and buffering members are provided, it is possible to: buffer an impact that is generated when engaging a bolt and a vibration that is generated by the housing; prevent the deformation of the chassis by supporting the housing and the chassis while the bushes and the buffering members are interposed therebetween; and stably fix the housing to the chassis.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
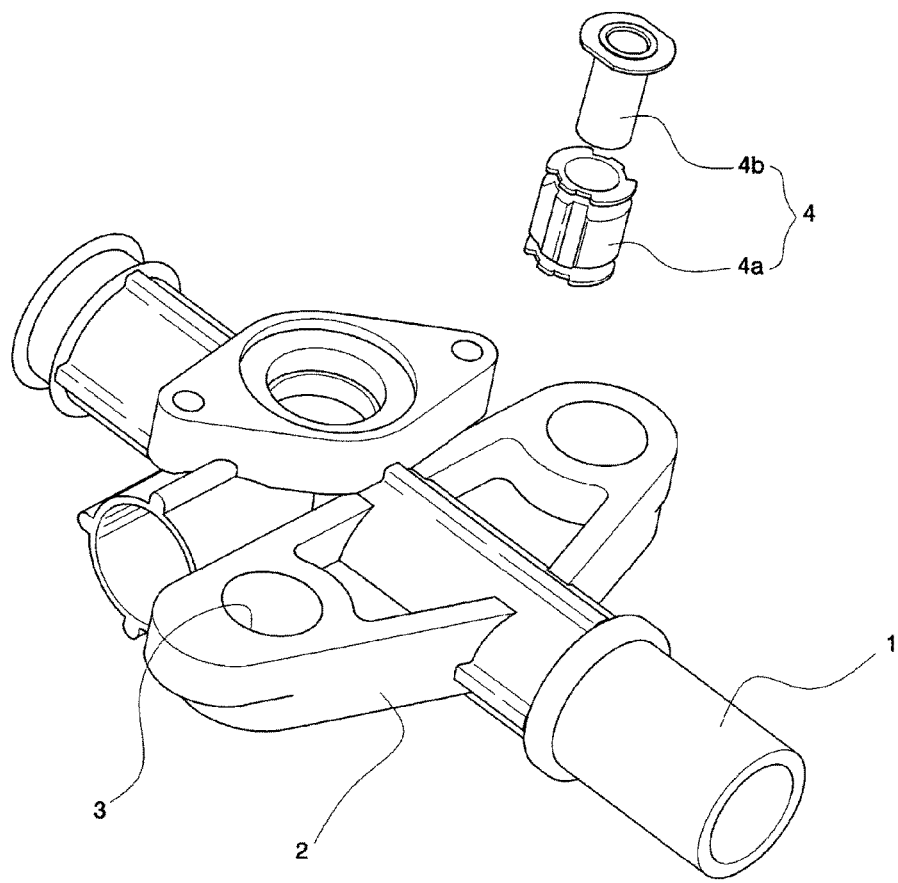
FIG. 1 is an exploded perspective view of a mounting bush of a housing for the conventional steering system.

Hereinafter, embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
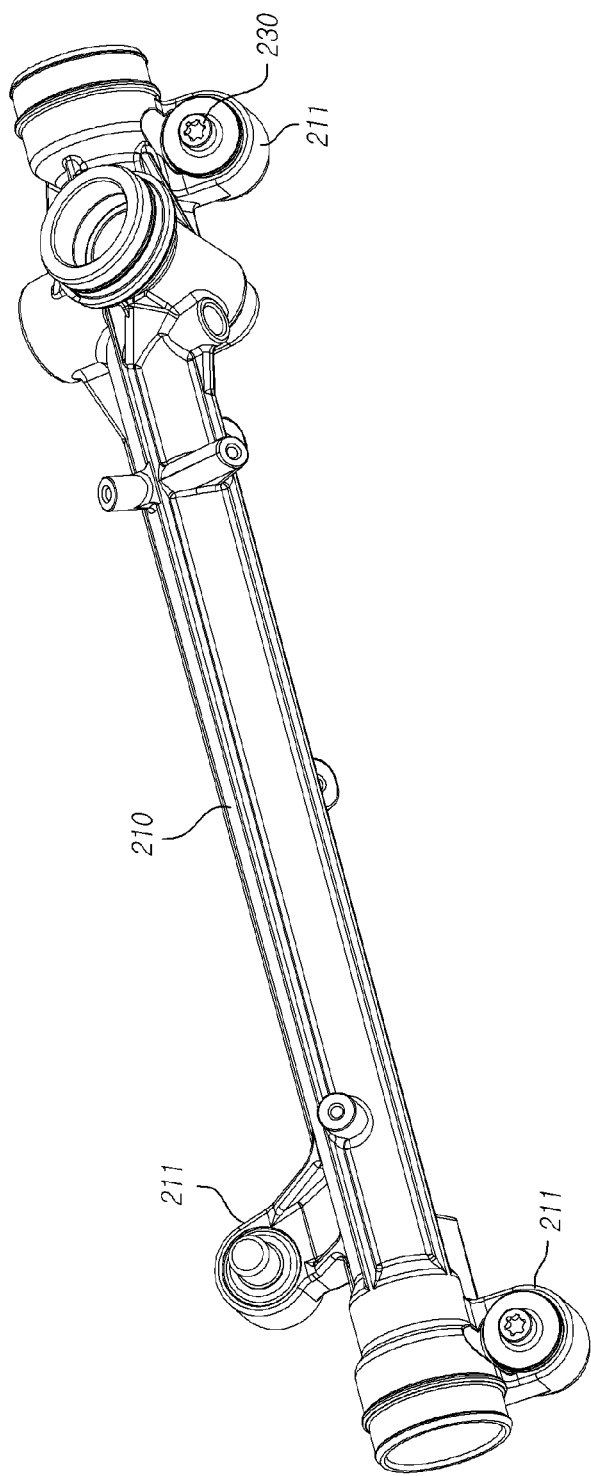
FIG. 2 is a perspective view of a mounting assembly for a vehicle, according to embodiments of the present invention.
Figure 3:
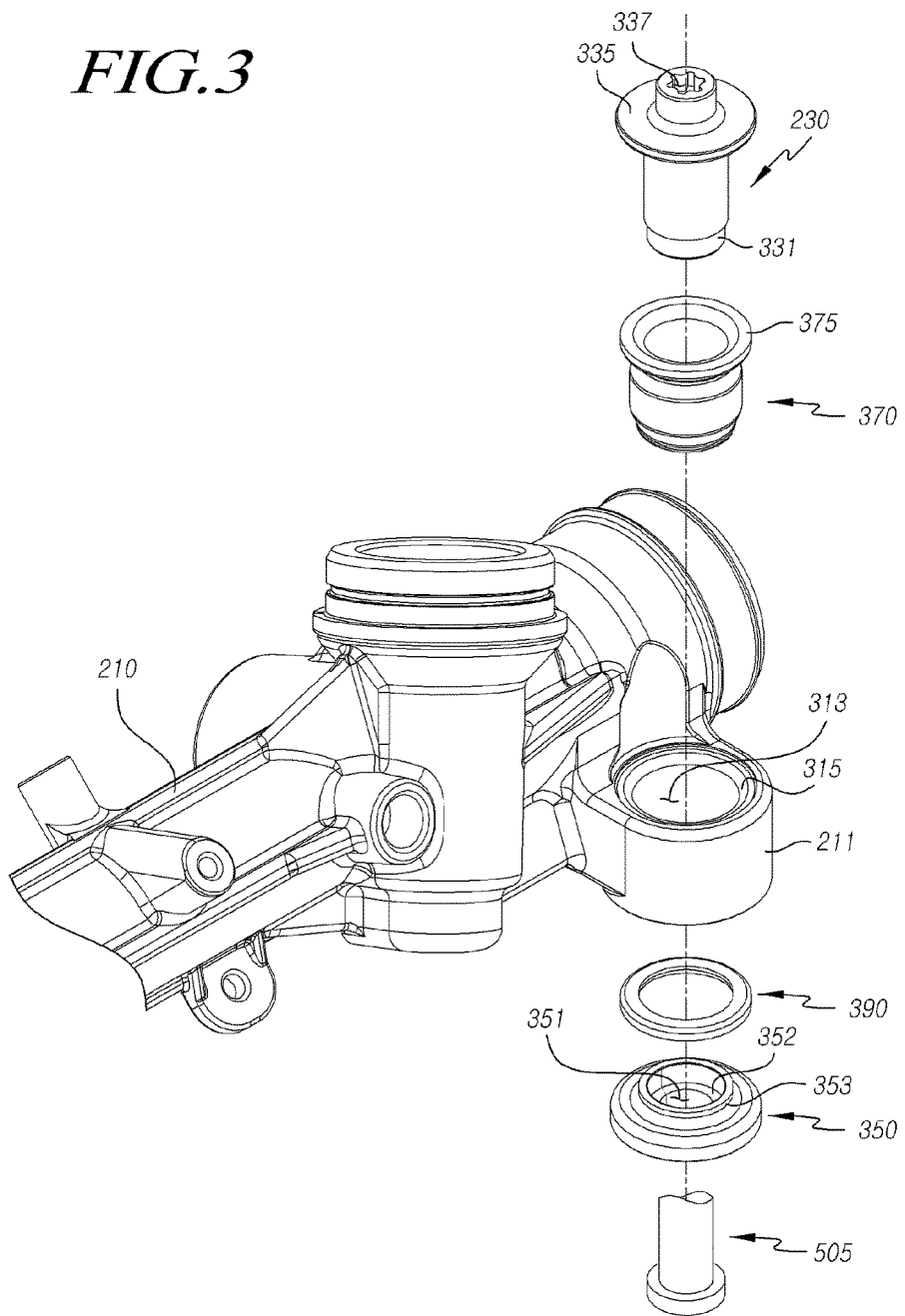
FIG. 3 is an exploded perspective view of a mounting assembly for a vehicle, according to embodiments of the present invention.
Figure 4:
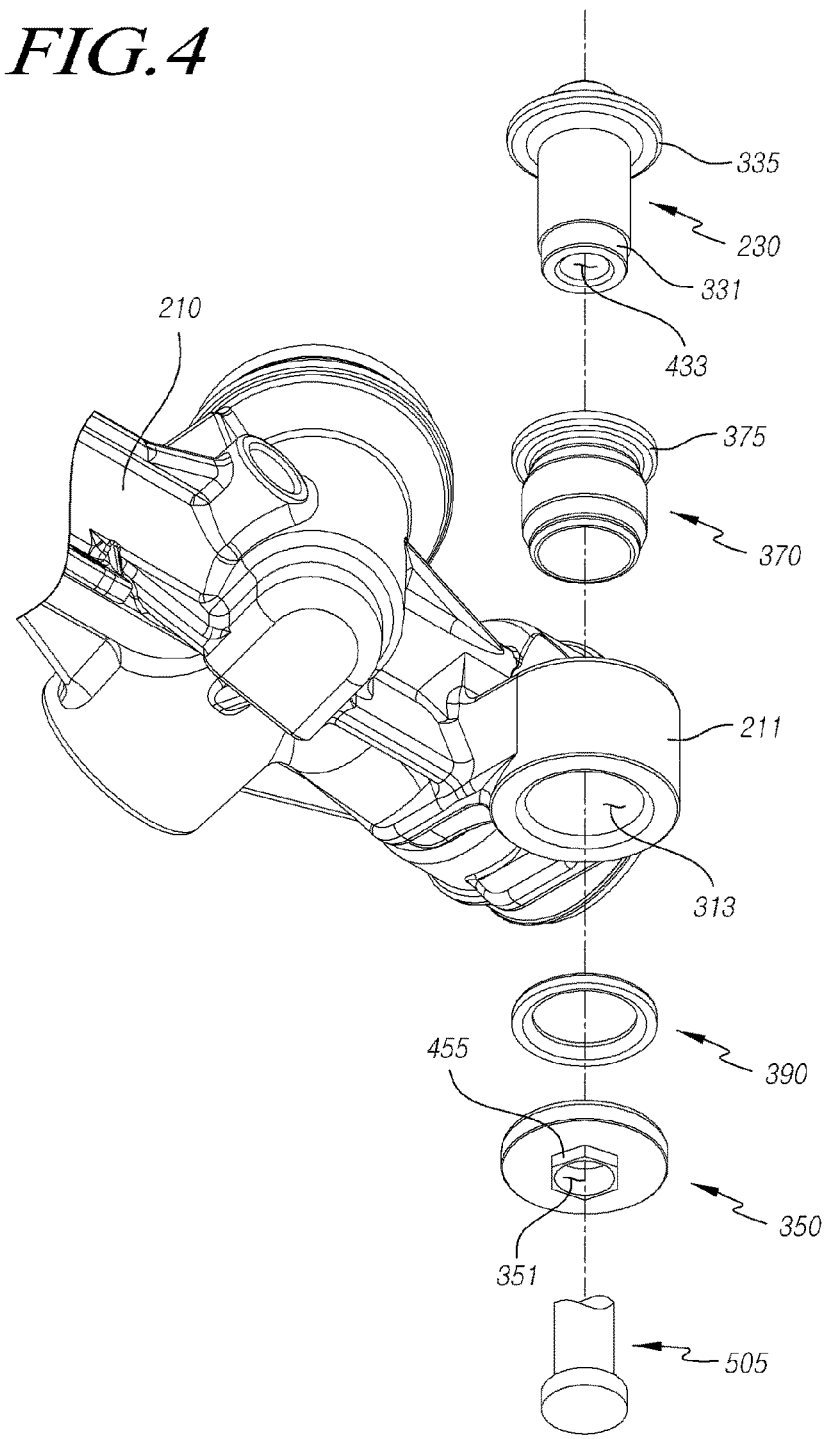
FIG. 4 is an exploded perspective view of a mounting assembly for a vehicle, according to embodiments of the present invention.
Figure 5:
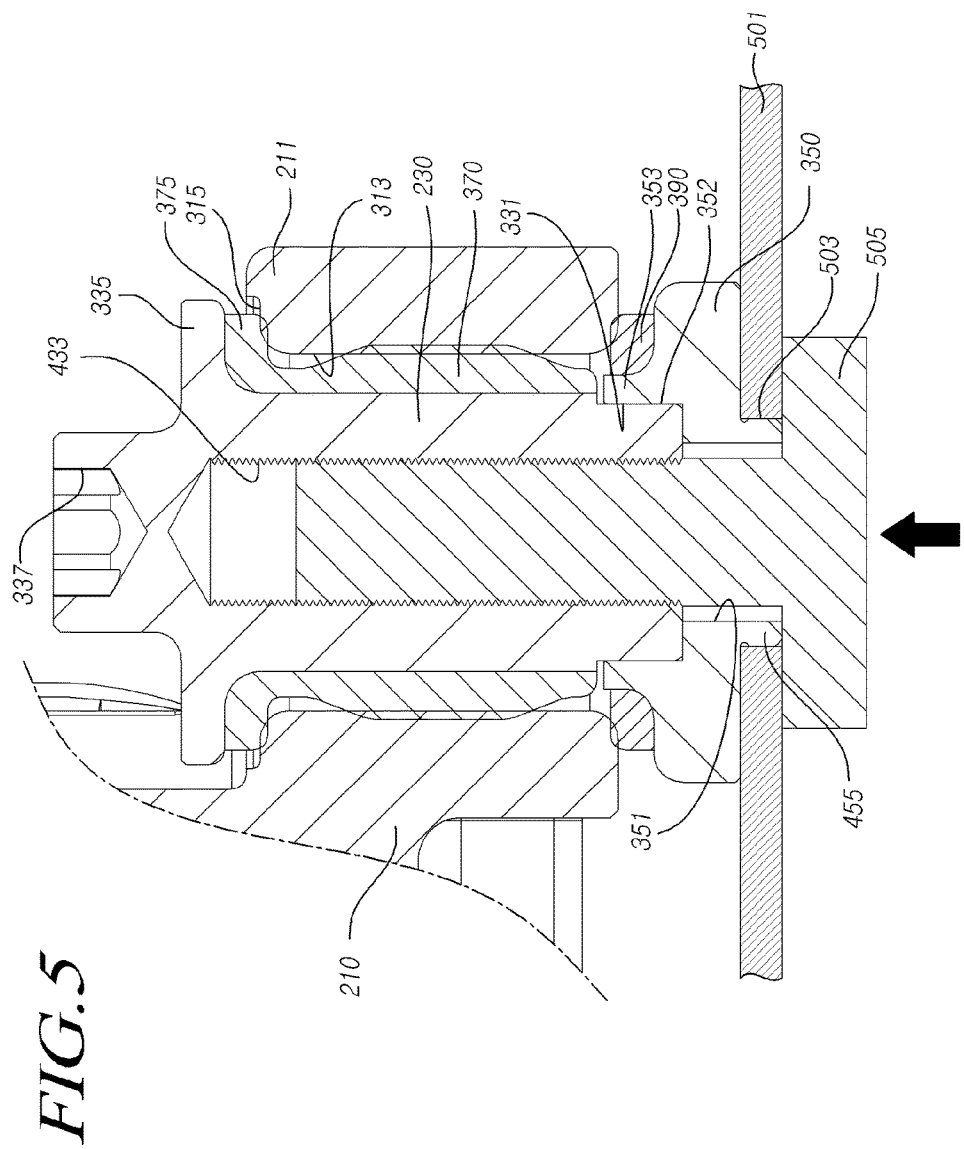
FIG. 5 is a cross-sectional view of a mounting assembly for a vehicle, according to embodiments of the present invention.
Figure 6:
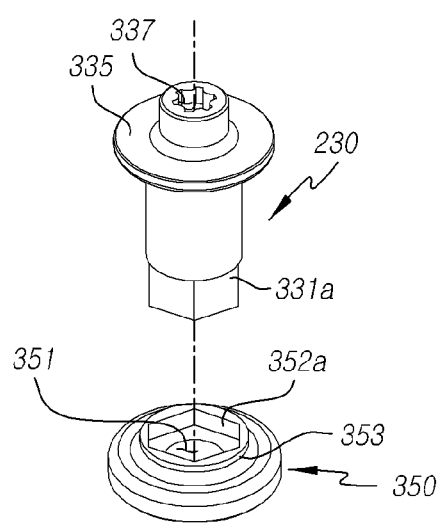
FIGS. 6 and 7 are exploded perspective views showing a structure for preventing the rotation of the first bush and the second bush in the vehicle mounting assembly, according to embodiments of the present invention.
Figure 7:
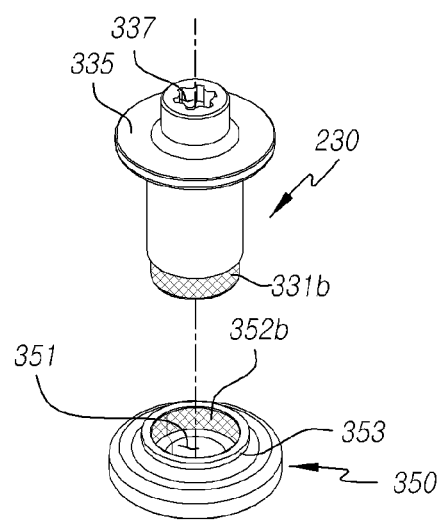
Figure 8:
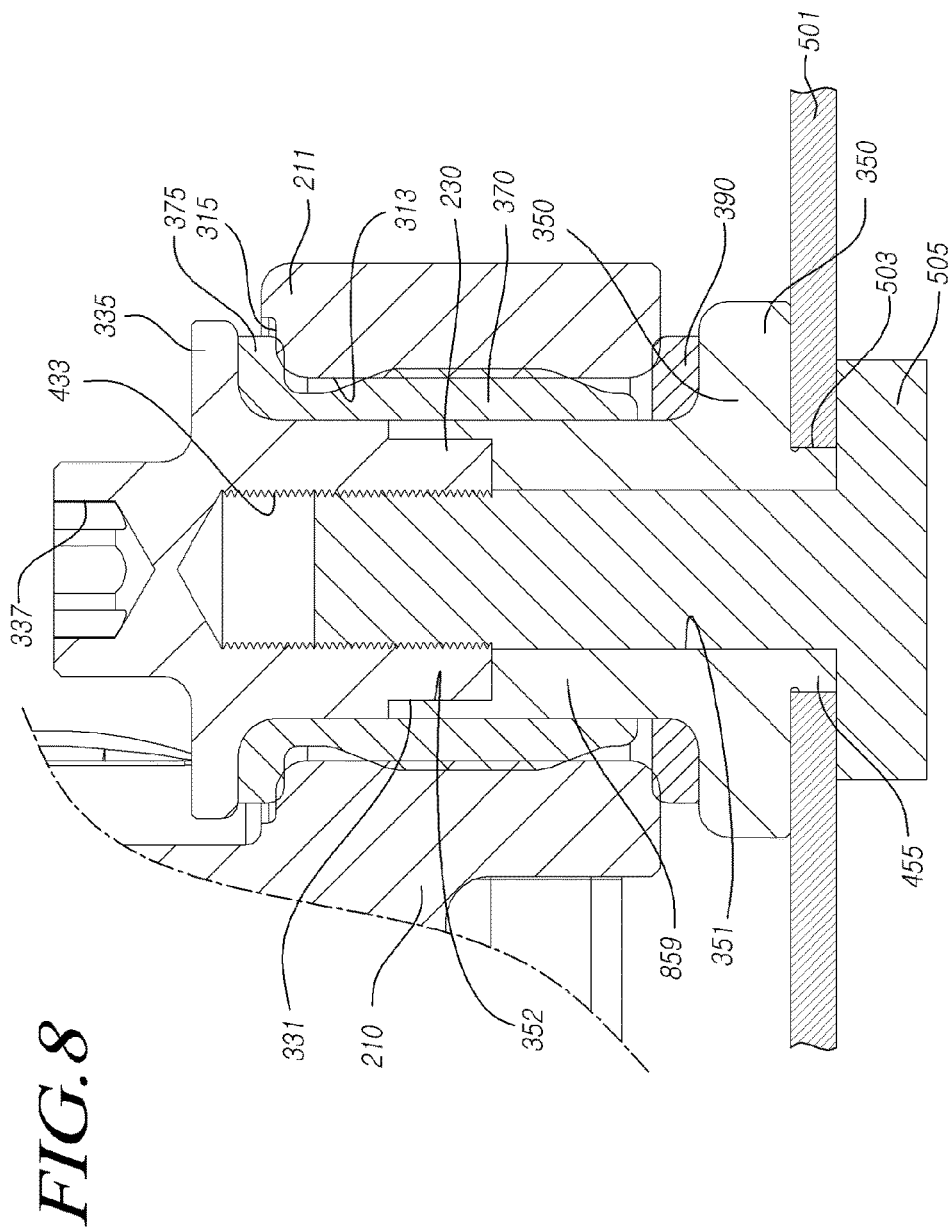
FIG. 8 is a cross-sectional view of a mounting assembly for a vehicle, according to another embodiment of the present invention.

FIG. 2 is a perspective view of a mounting assembly for a vehicle, according to embodiments of the present invention, and FIG. 3 is an exploded perspective view of a mounting assembly for a vehicle, according to embodiments of the present invention. FIG. 4 is an exploded perspective view of a mounting assembly for a vehicle, according to embodiments of the present invention, and FIG. 5 is a cross-sectional view of a mounting assembly for a vehicle, according to embodiments of the present invention. FIGS. 6 and 7 are exploded perspective views showing a structure for preventing the rotation of the first bush and the second bush in the vehicle mounting assembly, according to embodiments of the present invention; and FIG. 8 is a cross-sectional view of a mounting assembly for a vehicle, according to another embodiment of the present invention.

As shown in the drawings, the vehicle mounting assembly for coupling a housing 210 in which a steering device is mounted to a chassis 501, according to embodiments of the present invention, includes: a housing 210 that has a mounting hole 313 formed therein; a first bush 230 that is coupled to the mounting hole 313 and has a coupling groove 433 formed therein; a second bush 350 that is provided between the housing 210 and the chassis 501 and has a through hole 351 formed to lead to the coupling groove 433; and a bolt 505 for fixing the housing 210 to the chassis 501, wherein the second bush 350 is coupled to the bottom of the first bush 230 while being inserted into the same, and the bolt 505 is engaged with the coupling groove 433 by passing through an assembly hole 503 that is formed in the chassis 501 and the through hole 351.

The housing 210, for example, surrounds the rack bar, and is provided with a mounting portion 211 that protrudes from the outer surface thereof. A plurality of mounting portions 211 may be provided in the housing 210, and the following description will be made of an example in which three mounting portions 211 are provided in the housing 210 for the simplicity of explanation.

In addition, the first bush 230, the second bush 350, and the bolt 505 that are inserted into the mounting portion 211 are provided in order to fix the housing 210 to the chassis 501.

The coupling groove 433 is formed in the first bush 230 to which the bolt 505 is engaged in order to thereby fix the housing 210 to the chassis 501. The first bush 230 and the bolt 505 are engaged with each other while the mounting portion 211 of the housing 210, the second bush 350, and the chassis 501 are provided between the first bush 230 and the bolt 505 in order to thereby fix the housing 210 to the chassis 501.

At this time, the bolt 505 is engaged from the chassis 501 toward the housing 210, and thus, it is possible to secure a space for installing the housing 210 opposite to the chassis 501 and peripheral parts connected to the housing 210.

Further, the first bush 230 is coupled to the mounting hole 313 that is formed in the mounting portion 211, and the first buffering member 370 in a cylindrical shape is provided between the first bush 230 and the mounting hole 313 to buffer a vibration and impact that are transferred in the radial direction.

The second bush 350 is provided between the mounting portion 211 and the chassis 501 to prevent the chassis 501 from being deformed due to the engaging force of the bolt 505 that engages with the first bush 230. Particularly, the second buffering member 390 is interposed between the mounting portion 211 and the second bush 350 in order to thereby buffer a vibration and impact that are transferred in the axial direction.

The first bush 230, the second bush 350, the first buffering member 370, the second buffering member 390, and the bolt 505 will be described in more detail later.

The mounting hole 313, to which the first bush 230 is coupled, is formed in the mounting portion 211, and the first buffering member 370 in a cylindrical shape is provided between the mounting hole 313 and the first bush 230.

The first buffering member 370 is installed between the mounting hole 313 and the first bush 230 while being compressed to resiliently support the mounting hole 313 and the first bush 230.

The first bush 230 has a stopper portion 335 that protrudes from the outer surface of the upper portion thereof in the radial direction to then rest on the mounting portion 211. The stopper portion 335 is supported by the upper surface of the mounting portion 211 in order to thereby prevent the first bush 230 from passing through the mounting hole 313.

A receiving groove 315 is formed on the upper surface of the mounting portion 211 to receive the stopper portion 335, and the stopper portion 335 rests in the receiving groove 315 to then be supported by the mounting portion 211.

In addition, a flange 375 is formed to protrude from the outer surface of the upper end of the first buffering member 370 that is provided between the mounting portion 211 and the first bush 230. Furthermore, the flange 375 is interposed between the stopper portion 335 and the receiving groove 315 to resiliently support the same.

The first buffering member 370 resiliently supports the mounting hole 313 and the first bush 230 in the radial direction while being interposed therebetween, and the flange 375 of the first buffering member 370 resiliently supports the stopper portion 335 of the first bush 230 and the receiving groove 315 of the mounting portion 211 in the axial direction while being interposed therebetween.

In addition, the first bush 230 has the coupling groove 433 that is formed to be recessed on the bottom side thereof, and the coupling groove 433 is formed with a thread to be engaged with the bolt 505.

Furthermore, the first bush 230 has a tool groove 337 formed on the top surface thereof for receiving a tool, and when engaging the bolt 505 with the first bush 230, the bolt 505 may be easily engaged with the first bush 230 while the first bush 230 is fixed by inserting a tool into the tool groove 337.

In addition, a tool assembly portion (not shown) may be provided in which the outer surface of the upper end of the first bush 230 is shaped into a polygon or the outer surface is shaped into a plane on one side thereof so that a tool may be coupled to the tool assembly portion (not shown) to easily engage the bolt 505 to the first bush 230.

The second bush 350 is provided between the mounting portion 211 and the chassis 501 to support the same so as to prevent the deformation of the chassis 501 caused by a coupling force of the bolt 505 that is engaged with the first bush 230, and the second bush 350 is coupled to the outer surface of the first bush 230 while being compressed.

In other words, the second bush 350 plays the role of increasing the contact area between the mounting portion 211 and the chassis 501, and evenly distributes an impact that is generated during the engagement of the first bush 230 and the bolt 505 or a vibration that is generated by the housing 210 to then prevent the same from being intensively transferred to the chassis 501.

If it were not for the second bush 350, the bottom end of the first bush 230 or the bottom end of the mounting portion 211 could press and deform the chassis 501 when engaging the bolt 505 with the first bush 230. Therefore, the second bush 350 is provided between the mounting portion 211 and the chassis 501, and the second buffering member 390 is additionally provided as will be described below.

The second buffering member 390 is formed in an annular shape, and is provided between the second bush 350 and the mounting portion 211. The second buffering member 390 resiliently supports the second bush 350 and the mounting portion 211 in the axial direction while being compressed when engaging the first bush 230 with the bolt 505.

The second buffering member 390 resiliently supports the mounting portion 211 and the chassis 501 in the axial direction while being interposed therebetween together with the flange 375 of the first buffering member 370, and the first buffering member 370 and the second buffering member 390 may be integrally formed as one piece.

In addition, a guide portion 353 is formed to protrude upwards from the second bush 350 to position the second buffering member 390 between the second bush 350 and the mounting portion 211.

The second buffering member 390 is coupled to the outer surface of the guide portion 353 so as to be stably positioned between the second bush 350 and the mounting portion 211.

In addition, the second bush 350 has the through hole 351 for the bolt 505 to pass through the same such that the through hole 351 leads to the coupling groove 433. Then, the bolt 505 engages with the coupling groove 433 by passing through the through hole 351.

In addition, the guide portion 353 is formed to protrude upwards along the through hole 351, and the second buffering member 390 is coupled to the outer surface of the guide portion 353.

In addition, the second press-fitting portion 352 is formed to be extended inwards from the through hole 351 through which the bottom end of the first bush 230 is inserted.

The bottom end of the first bush 230 is inserted into the second bush 350 to then be coupled. At this time, the first bush 230 has the first press-fitting portion 331 that is formed to be recessed inwards on the outer surface thereof, and the first press-fitting portion 331 is coupled to the second press-fitting portion 352 when the bottom end of the first bush 230 is inserted into the second bush 350.

Furthermore, the second bush 350 has a positioning portion 455 that is formed to protrude downwards along the through hole 351, and the housing 210 is mounted on the chassis 501 by inserting the positioning portion 455 into the assembly hole 503 of the chassis 501 in order to thereby fix the position between the chassis 501 and housing 210. Then, the bolt 505 can be easily engaged with the first bush 230.

In addition, in order to prevent the rotation between the positioning portion 455 and the assembly hole 503 when engaging the first bush 230 with the bolt 505, the outer surface of the positioning portion 455 may be formed in a polygonal shape or may be formed in a planar shape on one side thereof, and the assembly hole 503 is formed to have a shape corresponding to the outer surface of the positioning portion 455.

In other words, if the outer surface of the positioning portion 455 is formed in a polygonal shape, the assembly hole 503 is also formed in a polygonal shape in order to thereby prevent a slip between the positioning portion 455 and the assembly hole 503.

Furthermore, if one side of the outer surface of the positioning portion 455 is formed in a planar shape, one side of the assembly hole 503 is also formed in a planar shape so that the plane portion of the positioning portion 455 comes into contact with the plane portion of the assembly hole 503 in order to thereby prevent a slip between the positioning portion 455 and the assembly hole 503.

In addition, as shown in FIGS. 6 and 7, in order to prevent a slip or rotation between the first bush 230 and the second bush 350 because of a coupling force of the bolt 505 when engaging the first bush 230 with the bolt 505, the first press-fitting portion 331a or 331b and the second press-fitting portion 352a or 352b may be formed in a polygonal shape or may be formed in a planar shape on one side thereof. Alternatively, the first press-fitting portion 331a or 331b and the second press-fitting portion 352a or 352b may be knurl-finished or may be coated with a friction material.

Referring to FIG. 6, in order to prevent a slip between the first press-fitting portion 331a and the second press-fitting portion 352a, the first press-fitting portion 331a is formed in a polygonal shape on the outer surface thereof, or is formed in a planar shape on one side thereof. In addition, the inner surface of the second press-fitting portion 352a is formed to correspond to the shape of the first press-fitting portion 331a so that the first press-fitting portion 331a is inserted into the second press-fitting portion 352a to then be coupled.

According to this, since the first press-fitting portion 331a and the second press-fitting portion 352a are coupled to each other while one is inserted into the other by means of the polygonal portion or the planar portion that come into contact with each other, it is possible to prevent a slip between the first bush 230 and the second bush 350 and the rotation of the first bush 230.

Referring to FIG. 7, in order to prevent a slip between the first press-fitting portion 331b and the second press-fitting portion 352b, the outer surface of the first press-fitting portion 331b and the inner surface of the second press-fitting portion 352b are knurl-finished or are coated with a friction material. Then, the first press-fitting portion 331b is inserted into the second press-fitting portion 352b to then be coupled.

At this time, the first press-fitting portion 331b and the second press-fitting portion 352b are coupled to each other by means of a tight fit so that the knurl-finished surfaces or the friction material-coated surfaces come into a tight contact with each other in order to thereby prevent a slip between the first press-fitting portion 331b and the second press-fitting portion 352b and in order to thereby prevent the rotation of the first bush 230.

In addition, the friction material coated on the first press-fitting portion 331b and the second press-fitting portion 352b has a large frictional coefficient.

As described above, the first press-fitting portion 331a or 331b and the second press-fitting portion 352a or 352b may be formed in a polygonal shape or in a planar shape, or may be knurl-finished or may be coated with a friction material, thereby preventing a slip between the first bush 230 and the second bush 350 and the rotation of the first bush 230.

In addition, since the first bush 230 and the second 350 are fixed to each other and since the second bush 350 and the chassis 501 are fixed to each other, it is easy to engage the bolt 505 with the first bush 230.

That is, since the first bush 230 and the second bush 350 are fixed to the chassis to not rotate even if a tool is not inserted into the tool groove 337 of the first bush 230 for fixing the same, it is easy to engage the bolt 505 with the first bush 230.

Meanwhile, the first bush 230 has the stopper portion 335 that is formed to have a greater diameter than that of the first bush 230 to then prevent the first bush 230 from passing through the mounting hole 313, and the second bush 350 is formed to have a greater diameter than that of the first bush 230 to increase the support area for the chassis 501.

In addition, as shown in FIG. 8, an extension portion 859 is provided to protrude from the upper surface of the second bush 350 in the axial direction of the bolt 505.

The extension portion 859 is inserted into the first buffering member 370 to be coupled to the bottom end of the first bush 230. According to this, the position of the second bush 350 may be stably fixed.

Furthermore, the second buffering member 390 is coupled to the outer surface of the extension portion 859 to resiliently support the mounting portion 211 and the second bush 350 while being interposed therebetween.

According to the embodiments of the present invention that have shapes and structures described above, since the bolt is engaged on the side of a chassis, it is possible to: easily engage a bolt without interfering with a housing or peripheral parts connected to the same; and secure a space for installing the housing and the peripheral parts.

Furthermore, by adopting bushes and buffering members, it is possible to: buffer an impact that is generated when engaging a bolt and a vibration that is generated by the housing; prevent the deformation or denting of the chassis by supporting the housing and the chassis while the bushes and the buffering members are interposed therebetween; and stably fix the housing to the chassis.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A mounting assembly for a vehicle for coupling, to a chassis, a housing in which a steering device is mounted, the mounting assembly comprising:
   a first bush configured to be coupled to a mounting hole that is formed in the housing, and configured to have a coupling groove formed therein;
   a second bush configured to be provided between the housing and the chassis, and configured to have a through hole formed to lead to the coupling groove; and
   a bolt configured to fix the housing to the chassis,
   wherein the second bush is inserted into the bottom of the first bush to then be coupled, and the bolt is engaged with the coupling groove by passing through an assembly hole that is formed in the chassis and by passing the through hole,
   wherein a first buffering member in a cylindrical shape is provided between the mounting hole and the first bush, and the first buffering member resiliently supports the housing and the first bush while being interposed therebetween, and
wherein a first press-fitting portion is formed to be recessed inwards on the outer surface of the first bush, and a second press-fitting portion is formed to be extended inwards from the through hole into which the first press-fitting portion is inserted.

2. The mounting assembly for a vehicle according to claim 1, wherein the second bush has a positioning portion that is formed to protrude downwards along the through hole, and the positioning portion is coupled to the assembly hole to then fix the position of the second bush.

3. The mounting assembly for a vehicle according to claim 2, wherein the outer surface of the positioning portion is formed in a polygonal shape or is formed in a planar shape on one side thereof, and the assembly hole is formed to have a shape corresponding to the positioning portion to then prevent the rotation between the assembly hole and the positioning portion.

4. The mounting assembly for a vehicle according to claim 3, wherein the outer surface of the first press-fitting portion is formed in a polygonal shape or is formed in a planar shape on one side thereof in order to prevent the rotation between the first press-fitting portion and the second press-fitting portion, and the inner surface of the second press-fitting portion is formed to have a shape corresponding to the first press-fitting portion.

5. The mounting assembly for a vehicle according to claim 3, wherein the outer surface of the first press-fitting portion and the inner surface of the second press-fitting portion are formed to be knurl-finished or to be coated with a friction material, respectively, in order to prevent the rotation between the first press-fitting portion and the second press-fitting portion.

6. The mounting assembly for a vehicle according to claim 1, wherein a second buffering member is provided between the second bush and the housing.

7. The mounting assembly for a vehicle according to claim 6, wherein the second bush has a guide portion that is formed to protrude from the upper surface thereof along the through hole, and the second buffering member is coupled to the outer surface of the guide portion.

8. The mounting assembly for a vehicle according to claim 1, wherein the first bush has a tool groove that is formed on the top surface thereof into which a tool is inserted.

9. A mounting assembly for a vehicle for coupling, to a chassis, a housing in which a steering device is mounted, the mounting assembly comprising:
   a first bush configured to be coupled to a mounting hole that is formed in the housing, and configured to have a coupling groove formed therein;
   a second bush configured to be provided between the housing and the chassis, and configured to have a through hole formed to lead to the coupling groove; and
   a bolt configured to fix the housing to the chassis, wherein the second bush is inserted into the bottom of the first bush to then be coupled, and the bolt is engaged with the coupling groove by passing through an assembly hole that is formed in the chassis and by passing the through hole,
   wherein a first buffering member in a cylindrical shape is provided between the mounting hole and the first bush, and the first buffering member resiliently supports the housing and the first bush while being interposed therebetween, and
wherein the first bush has a stopper portion that is formed to protrude from the outer surface of the upper portion thereof in the radial direction, and the housing has a receiving groove that is formed to receive the stopper portion, and wherein the first bush supports the housing.

10. The mounting assembly for a vehicle according to claim 9, wherein the first buffering member is provided with a flange that is formed to protrude from the outer surface of the upper end thereof in the radial direction to buffer the stopper portion and the receiving groove while being interposed therebetween.

* * * * *